(12) United States Patent
Binder et al.

(10) Patent No.: US 10,779,049 B2
(45) Date of Patent: *Sep. 15, 2020

(54) USER-TAILORED CONTENT ACCESS MENUS

(71) Applicant: T-Mobile USA, Inc., Bellevue, WA (US)

(72) Inventors: Jeffrey Binder, Denver, CO (US); Miles Fenn, Denver, CO (US); Charles Hasek, Denver, CO (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/520,736

(22) Filed: Jul. 24, 2019

(65) Prior Publication Data

US 2019/0349639 A1    Nov. 14, 2019

Related U.S. Application Data

(63) Continuation of application No. 15/279,037, filed on Sep. 28, 2016, now Pat. No. 10,412,457.

(51) Int. Cl.
*H04N 21/482* (2011.01)
*H04N 21/466* (2011.01)
*H04N 21/442* (2011.01)

(52) U.S. Cl.
CPC ..... *H04N 21/482* (2013.01); *H04N 21/44222* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 6,081,750 A * | 6/2000 | Hoffberg | G06F 3/00 700/17 |
| 7,003,654 B2 | 2/2006 | Baron | |
| 8,006,263 B2 | 8/2011 | Ellis et al. | |
| 8,024,755 B2 | 9/2011 | Nishikawa et al. | |
| 8,151,215 B2 | 4/2012 | Baurmann et al. | |
| 8,181,201 B2 | 5/2012 | Goldenberg et al. | |
| 8,365,235 B2 | 1/2013 | Hunt et al. | |
| 8,561,108 B2 | 10/2013 | Bhogal et al. | |
| 9,100,710 B2 | 8/2015 | Kardatzke | |
| 9,380,343 B2 | 6/2016 | Webster | |
| 9,544,620 B2 | 1/2017 | Wong et al. | |
| 9,571,784 B2 | 2/2017 | Roberts et al. | |
| 9,729,942 B2 | 8/2017 | Vehovsky et al. | |

(Continued)

*Primary Examiner* — Alexander Q Huerta
(74) *Attorney, Agent, or Firm* — Brownstein Hyatt Farber Schreck, LLP

(57) ABSTRACT

An electronic device includes a non-transitory storage medium storing instructions and a processing unit that executes the instructions to present a group of selectable elements. Each of the selectable elements in the group corresponds to content assets accessed by a user. The group is ordered according to chronological access. Selection of a selectable element from the group provides access to content determined based on the respective content asset, an application used to access the respective content asset, and information regarding previous user behavior. The electronic device may be a content access device, such as a set top box, a digital video recorder, and so on.

13 Claims, 4 Drawing Sheets

(56) References Cited

U.S. PATENT DOCUMENTS

| | | | |
|---|---|---|---|
| 9,794,643 B2 | 10/2017 | Lewis et al. | |
| 9,936,254 B2 | 4/2018 | Seo et al. | |
| 9,986,284 B2 | 5/2018 | Bae et al. | |
| 2002/0053084 A1 | 5/2002 | Escobar et al. | |
| 2002/0056098 A1 | 5/2002 | White | |
| 2007/0061832 A1 | 3/2007 | Kim et al. | |
| 2009/0158326 A1* | 6/2009 | Hunt | G11B 27/34 |
| | | | 725/38 |
| 2009/0249397 A1* | 10/2009 | Bhogal | H04N 21/44222 |
| | | | 725/40 |
| 2010/0114914 A1 | 5/2010 | Gerges et al. | |
| 2010/0262986 A1 | 10/2010 | Adimatyam et al. | |
| 2012/0023256 A1* | 1/2012 | Chen | H04L 47/10 |
| | | | 709/231 |
| 2012/0060190 A1* | 3/2012 | Lee | H04N 21/482 |
| | | | 725/46 |
| 2012/0246684 A1 | 9/2012 | Yarvis et al. | |
| 2013/0080968 A1* | 3/2013 | Hanson | H04N 21/4532 |
| | | | 715/783 |
| 2013/0305272 A1 | 11/2013 | Fullett et al. | |
| 2014/0337869 A1 | 11/2014 | Faulkner et al. | |
| 2015/0067724 A1 | 3/2015 | Johnson et al. | |
| 2015/0074604 A1* | 3/2015 | Seo | H04N 21/4826 |
| | | | 715/825 |
| 2016/0007073 A1* | 1/2016 | Bae | H04N 5/44543 |
| | | | 725/43 |
| 2016/0014461 A1* | 1/2016 | Leech | H04N 21/4312 |
| | | | 725/14 |
| 2016/0066040 A1* | 3/2016 | Webster | H04N 21/4667 |
| | | | 725/34 |
| 2018/0359535 A1* | 12/2018 | Hasek | H04N 21/482 |
| 2020/0117323 A1* | 4/2020 | Binder | H04N 21/4826 |

\* cited by examiner

USER-TAILORED CONTENT ACCESS MENUS

CROSS-REFERENCE TO RELATED APPLICATION(S)

This application is a continuation patent application of U.S. patent application Ser. No. 15/279,037, filed Sep. 28, 2016 and titled "User-Tailored Content Access Menus," the disclosure of which is hereby incorporated herein by reference in its entirety.

FIELD

The described embodiments relate generally to content access devices. More particularly, the present embodiments relate to facilitating navigation of content access devices in a way that is tailored to how a user interacts with content.

BACKGROUND

Many different electronic devices may function as content access devices by facilitating user access to various content assets. These content access devices may include computing devices, smart phones, tablet computing devices, and so on. Content access devices may present (such as via a display, speaker, and so on) and/or otherwise access content stored by the content access device, received or otherwise accessible via various communication media, and so on.

For example, a content access device may be a set top box, digital video recorder, network digital video recorder, and/or other device that allows a user to access content provided by a content delivery network and/or other networks, such as the Internet or one or more social media networks. Examples of a content delivery network include a satellite or cable television, movie, and/or other content provider.

Content access devices may provide access to a great deal of content of a variety of different types from a number of different sources. Content access devices may provide navigation and/or other user interfaces that allow users to find the content they wish to access amidst all of the accessible content.

SUMMARY

The present disclosure relates to content access menus that are tailored to users. A content access menu includes elements. The elements correspond to content assets that a user has accessed and are arranged chronologically. This is the "space" corresponding to the elements. When one of the elements is selected, content is presented determined based at least on the content asset that corresponded to the element and information about the user. This is the "place" corresponding to the selection elements. As a result, the user is presented with content that is tailored for that user based on the user's behaviors.

In various embodiments, an electronic device includes a non-transitory storage medium storing instructions and a processing unit that executes the instructions to present a group of selectable elements. Each of the selectable elements in the group corresponds to content assets accessed by a user. The group is ordered according to chronological access. Selection of a selectable element from the group provides access to content determined based on the respective content asset, an application used to access the respective content asset, and information regarding previous user behavior.

In some examples, the content is determined further based on the electronic device, a location of the electronic device, or a communication medium to which the electronic device is connected. In numerous examples, the content is the respective content asset. In some examples, the content assets are television assets, video on demand assets, and social media assets.

In various examples, a different electronic device was used to access the content assets. In some examples, the content is presented using a different application than the application used to access the respective content asset.

In numerous examples, the previous user behavior includes use of a different electronic device. In various examples, the processing unit presents an additional group of additional selectable elements wherein each of the additional selectable elements in the additional group corresponds to additional content assets accessed by an additional user.

In some embodiments, a method for facilitating navigation using an electronic device includes presenting a list of items wherein each item in the list corresponds to a content asset accessed by a user and the list is organized chronologically in order of access; receiving a selection of an item in the list; determining content to provide access to in response to the selection based on the respective content asset corresponding to the item in the list, an application used to access the respective content asset, and information regarding previous user behavior; and providing access to the determined content via the electronic device. In numerous examples, determining the content to provide access to in response to the selection is further based on a subsequently accessed content asset.

In various examples, the method further includes receiving input to remove an indicated item from the list and presenting a modified list that omits the indicated item. In numerous examples, the method further includes receiving a user behavior template determined based on monitoring multiple users and generating the information regarding the previous user behavior by modifying the user behavior template based on monitoring the user.

In some examples, determining the content to provide access to in response to the selection includes determining presentation of the content asset completed and determining the content to provide access to is an additional content asset related to the content asset. In numerous examples, determining the content to provide access to in response to the selection includes determining the content asset was accessed using a social media application, identifying a resource accessible via the social media application that corresponds to a subsequently accessed content asset, and selecting the resource as the determined content. In some examples, determining the content to provide access to in response to the selection includes determining the content asset was accessed from a source that is currently unavailable, locating an alternate version for the content asset from another source, and selecting the alternate version as the determined content.

In numerous embodiments, a content access system includes a control unit and content access device. The content access device receives a menu request from the control unit; presents an ordered sequence of menu icons that each represent a content asset accessed by a user using the content access device, the ordered sequence ordered according to an access time of the respective content asset;

receives a selection of one of the menu icons from the control unit; and presents content in response to the selection based on the one of the menu icons and usage statistics regarding the respective content asset. In various examples, a first of the menu icons represents a non-linear content asset and a second of the menu icons represents a linear content asset.

In some examples, the content presented in response to the selection is further based on a time period elapsed since the access time of the respective content asset. In various examples, the content presented in response to the selection is further based on a current time.

In numerous examples, the content access device is a set top box. In some various examples, the control unit is a remote that includes a user input component dedicated to causing the remote to transmit the menu request.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The following disclosure relates to content access menus that are tailored to users. A content access menu includes elements that correspond to content assets that a user has accessed and are arranged, organized, or sequenced in chronological order of access (e.g., chronological access or the order in which the content assets were chronologically accessed). When one of the elements is selected, content is presented determined based at least on the content asset that corresponded to the element and information about the user. Rather than presenting the original content asset that related to the element, this content access menu instead presents the user with content that is tailored for that user based on the user's behaviors such as navigation patterns. This improves operation of the content access device by reducing the time and resources used in facilitating user access to content, as well as by making it easier for users to find content they wish to access.

These and other embodiments are discussed below with reference to FIGS. 1-4. However, those skilled in the art will readily appreciate that the detailed description given herein with respect to these Figures is for explanatory purposes only and should not be construed as limiting.

Figure 1:
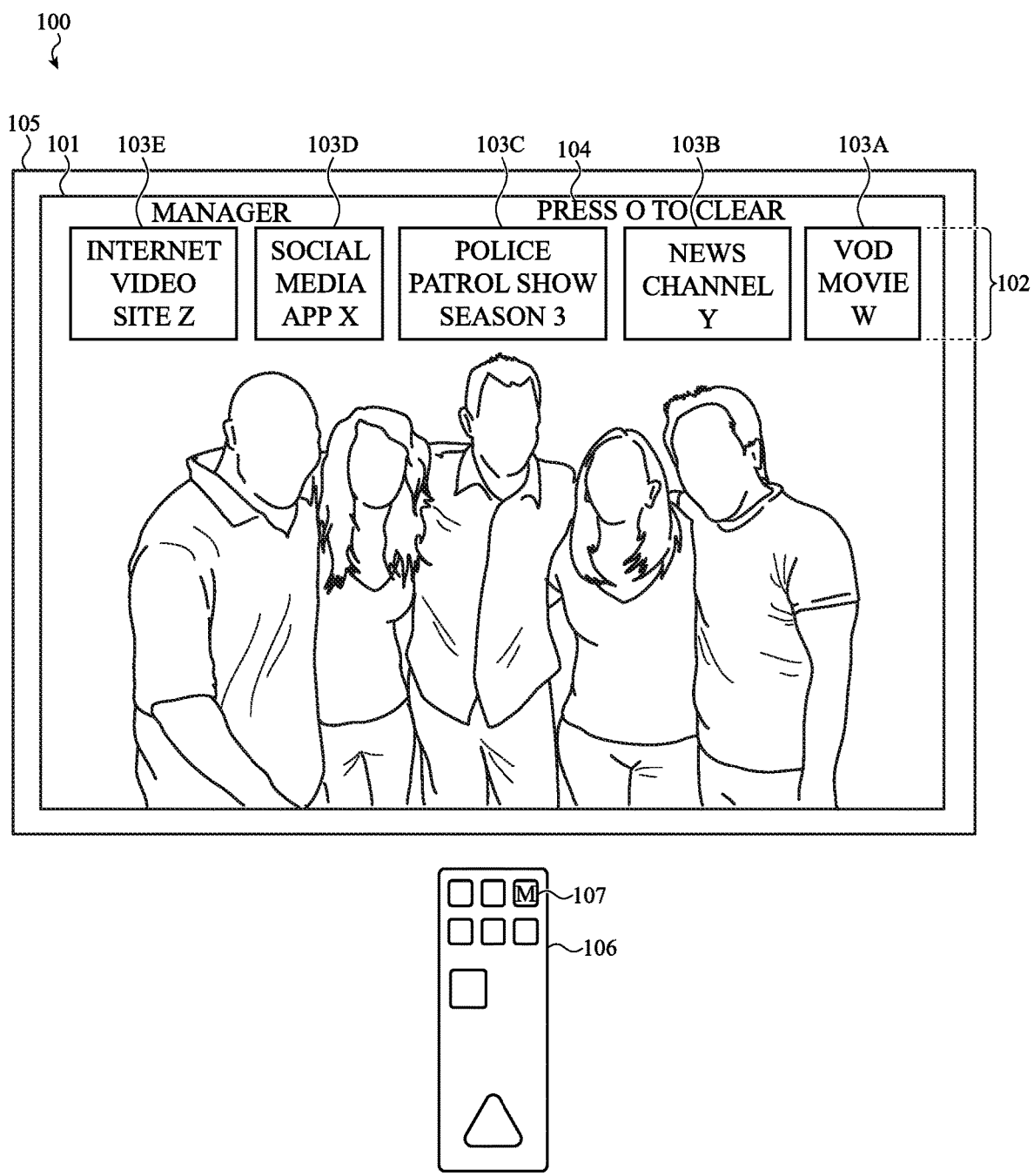
FIG. 1 depicts a content access system.

FIG. 1 depicts a content access system 100. The content access system 100 includes a content access device 105, such as a television or other display that may be connected to a set top box and/or other content receiver. The content access device 105 may present content 101, which may include a television show, movie, and/or any other kind of content. The content access device 105 may also present various menus and/or other navigational or other user interfaces. For example, the content access device 105 may present the menu 102.

In this example, the "Manager" menu 102 is an ordered group, list, ordered sequence, or sequence of icons 103A-103E, menu icons, thumbnails, or other items or selectable elements. Each icon 103A-103E may represent a content asset that was accessed by a user, such as via the content access device 105. The group may be ordered according to the time the content asset represented by each icon was accessed, forming a sequential "trail" of the user's interactions with content assets and/or content accessing applications. The icons 103A-103E may be selected to access content. However, rather than linking straight to the content asset that was previously accessed, a determination may be made regarding content to present and/or otherwise provide access to based on the represented content asset as well as monitored user behavior (e.g., previous user behavior, usage statistics, user behavior data, and so on) and/or other factors. In this way, the user's behaviors may be modelled to provide the user with the content the user intends to eventually get to in response to a selection rather than the content asset the user previously accessed.

For example, icon 103E corresponds to an Internet video site that the user accessed via a browser application. The user may have been viewing a particular video prior to switching to the social media application represented by icon 103D. If the user selects the icon 103E, it may be determined from monitored user behavior data that the user navigates to a home page of the Internet video site rather than re-watching the particular video they were watching previous to switching to other content assets 95% of the time. As such, the home page of the Internet video site may be determined and then presented to the user rather than the particular video.

Thus, the "spaces" corresponding to the icons 103A-103E may be determined based on the content assets the user previously accessed, but the "places" that the user is taken upon selecting the icons 103A-103E may be dependent on a variety of factors related to how the user behaves regarding content. In this context, the space is the application or group of content that the user accessed specific content assets within and the place is the specific content asset with which the user is presented access to when selecting one of the icons 103A-103E.

The icons 103A-103E may represent any kind of content asset or space that the user may access. This may include linear content (such as live broadcast television programming), non-linear content (such as movies or television shows available for viewing on demand), stored content (such as content assets stored by a digital video recorder), posts or other content available via social media or other applications (such as Facebook™, Twitter™, Instagram™ LinkedIn™, or the like), Internet sites (such as YouTube™, Hulu™, the CNN™ webpage, or the like), and/or any other kind of content that the user may access.

For example, as discussed above, the icon 103E may correspond to an Internet video site that the user accessed via a browser application and the icon 103D may correspond to a social media application. Similarly, the icon 103C may correspond to the third season of a television show accessed via a video viewing application, the icon 103B may correspond to a news channel accessed via the video viewing application, and the icon 103A may correspond to a video on demand movie accessed via an on demand application. The user may have accessed the video on demand movie most recently so the icon 103A is shown at the far right and the other content assets corresponding to the other icons 103B-103E are in an order corresponding to the illustrated order of the icons 103B-103E. Thus, the icons 103A-103E of the "Manager" menu 102 are arranged to indicate "breadcrumbs" of where the user has "traveled" while accessing content assets.

Any number of different factors may be evaluated when determining content to present in response to selection of one of the icons 103A-103E based on the monitored user behavior data. This can involve the time of the selection, a current time, a time period elapsed since the access time of the respective content asset, the time since the content asset represented by the icon 103A-103E was accessed (or an access time), the user's current location (home versus work, living room versus bedroom, and so on), the type of content asset represented by the icon 103A-103E, the application used to access the content asset represented by the icon 103A-103E, the number of content assets subsequently accessed, the particular content assets subsequently accessed, the applications subsequently accessed, and so on. In short, any factor that may indicate how a user will behave with respect to content may be taken into account.

For example, the icon 103C may correspond to the third season of a television show accessed via a video viewing application. However, the user may have finished all of the episodes in season three (in other words, a status of the user's previous access of the content of the third season of the television show). As such, season four of the television show may instead be presented upon selection of the icon 103C. Thus, determining content to provide access to in response to a selection may include determining presentation of a content asset related to a selection completed and determining the content to provide access to is an additional content asset related to the content asset.

By way of another example, user behavior data may indicate that the user returns to a previously accessed post in the social media application represented by the icon 103D 95% of the time if the selection of the icon 103D is within 10 minutes of previous access and a home screen of the social media application if the selection of the icon is more than 10 minutes of previous access. As such, the previously accessed post may be presented if the icon 103D is selected within 10 minutes of previous access and the home screen of the social media application may be presented if the icon 103D is selected more than 10 minutes since previous access.

By way of still another example, user behavior data may indicate that the user tends to watch R rated movies only in the user's bedroom and family comedies in the user's living room. As such, a list of family comedies may be presented if the icon 103A is selected and the content access device 105 is located in the user's living room whereas a list of R rated movies may be presented if the icon 103A is selected and the content access device is located in the user's bedroom.

In yet another example, the user may typically view local news in the morning and national news in the afternoon. If the user selects the icon 103B in the morning, local news content from the news channel represented by the icon 103B may be presented. However, if the user selects the icon 103B in the evening, national news content from the news channel represented by the icon 103B may be presented.

In still another example, the content delivery network that allows the user to access the television show represented by the icon 103C may only be available to the user when the user is connected through a communication medium in the user's home. When the user selects the icon 103C while connected to the communication network in the user's home, the television show may be presented. However, when the user selects the icon 103C while not connected to the communication medium in the user's home (such as when the user is at another location, when the user is traveling, when the communication medium is down, and so on), the content delivery network may not provide access to the television show. Instead, another source may be determined for the television show (such as an Internet television provider or the like) and the television show from the other source may be provided.

By way of another example, in some implementations, later content asset accesses may influence content selections. For example, "Movie W" represented by icon 103A was accessed subsequent to the social media application represented by icon 103D. When the icon 103D is selected, posts related to "Movie W" may be presented. Thus, determining the content to provide access to in response to the selection may be further based on a subsequently accessed content asset.

In various examples, behavior of the user may be monitored to generate the user behavior data. In some examples, information about behaviors of a general population of users other than the user may be received (as well as monitored user behavior data transmitted to be used elsewhere as part of general user behavior information). This may be received to use as a template or default user profile, which may then be modified by actual monitored user behavior. Such general user behavior information may be periodically received and used to update the user behavior data.

For example, a user behavior template may be received that is determined based on monitoring multiple users. Information regarding the previous user behavior may then be generated by modifying the user behavior template based on monitoring the user.

Conflicts between general user behavior data and actual monitored user behavior data may be resolved in various ways. For example, monitored user behavior data may generally outweigh general user behavior data. However, if the monitored user behavior data relating to a particular factor is more than a certain period of time old, such as one month, the general user behavior data may instead be used. Various implementations are possible and contemplated.

In this example, the icons 103A-103E of the "Manager" menu 102 track the content access of a single user. As such, each user may have a different menu 102. However, in various implementations one or more users may share a menu 102.

In some examples, the icons 103A-103E of the "Manager" menu 102 may track content accessed using only the content access device 105. However, in other examples, the icons 103A-103E of the "Manager" menu 102 may track content accessed by the user using one or more different content access devices 105. In such an implementation, information regarding content access may be transmitted between various devices so that any of the different content access devices 105 can present the menu 102. Similarly, any of the different content access devices 105 and/or other connected devices may monitor user behavior in order to update the user behaviors that are used to determine content to present when one of the icons 103A-103E is selected.

In various examples, a different electronic device other than the content access device 105 may have been used to access one or more of the content assets represented by the icons 103A-103E. Such an electronic device may be operable to communicate with the content access device 105, whether directly or indirectly. For example, the electronic device may be the user's smart phone and the content access device 105 may be the user's set top box. In numerous examples, the monitored user behavior may include monitored use of the different electronic device.

In some examples, the determined content may be presented using the same application that was used to access the respective content asset. However, in other examples the determined content may be presented using a different application than the application that was used to access the respective content asset. For example, a television program viewing application may have been used to access the respective content asset whereas the determined content may be presented in an Internet browser.

In this example, the menu 102 may be configured to be navigated by a user by the user changing focus between the icons 103A-103E and indicating a selection when focus is on the desired icon 103A-103E. The menu 102 may indicate which icon 103A-103E has focus by increasing the size of that icon 103A-103E compared to the other icons 103A-103E. As shown, the icon 103A is larger than the other icons because it has the focus. For example, the user may change focus among the icons 103A-103E by moving left and/or right using a direction pad or other input device. When the desired icon 103A-103E has focus, the user may press a selection button to access content associated with selection of the focus icon 103A-103E.

The menu 102 may update if the user accesses additional content assets. For example, an additional group of additional selectable elements may be presented after the user accesses additional content assets. The additional selectable elements in the additional group may correspond to the additional accessed content assets. In some implementations, the user may be able to share their menu 102 and/or information regarding the content assets they have accessed with other users, such as other users of the content access device 105, users of other electronic devices, and so on. In such a case, the additional group may correspond to additional content assets accessed by an additional user.

As discussed above, the menu 102 may track the content access path of a user. Each user may have a different content access path. Thus, each user may be presented with a different menu 102 corresponding to their different content access path.

As illustrated, the menu 102 may include one or more modification controls 104 for altering the menu 102. In this example, the menu 102 includes a modification control 104 that allows a user to clear the contents of the menu 102. Selecting this modification control 104 may remove the icons 103A-103E and cause the content assets previously accessed by the user to no longer be remembered. In other examples, the user may be able to specify to delete particular icons 103A-103E, reorder the icons 103A-103E, add to the menu 102, and/or otherwise modify the menu 102.

For example, the content access device 105 may receive input to remove an indicated item from the list of icons 103A-103E. In response, the content access device 105 may present a modified list version of the menu 102 that omits the indicated item.

The content access system 100 may also include a remote control 106 and/or other control unit operable to transmit one or more instructions to control the content access device 105. The remote control 106 may include one or more user interface components or user input components, such as a button 107. The button 107 may be selectable to request the menu 102. In some implementations, the button 107 may be a dedicated button for requesting the menu 102. The button 107 may be dedicated to causing the remote control 106 to transmit the menu 102 request in that the button 107 may not be usable to perform other functions.

Although the above describes each icon 103A-103E representing a different content asset that was accessed, it is understood that this is an example. In various implementations, other configurations are possible. In some implementations, access of a single content asset may generate multiple icons 103A-103E. For example, a user may frequently access both the news channel represented by the icon 103B and a web page associated with the news channel. As such, in some examples, icons 103A-103E may be generated for both the news channel and the web page whenever the user accesses either the news channel or the web page.

Figure 2:
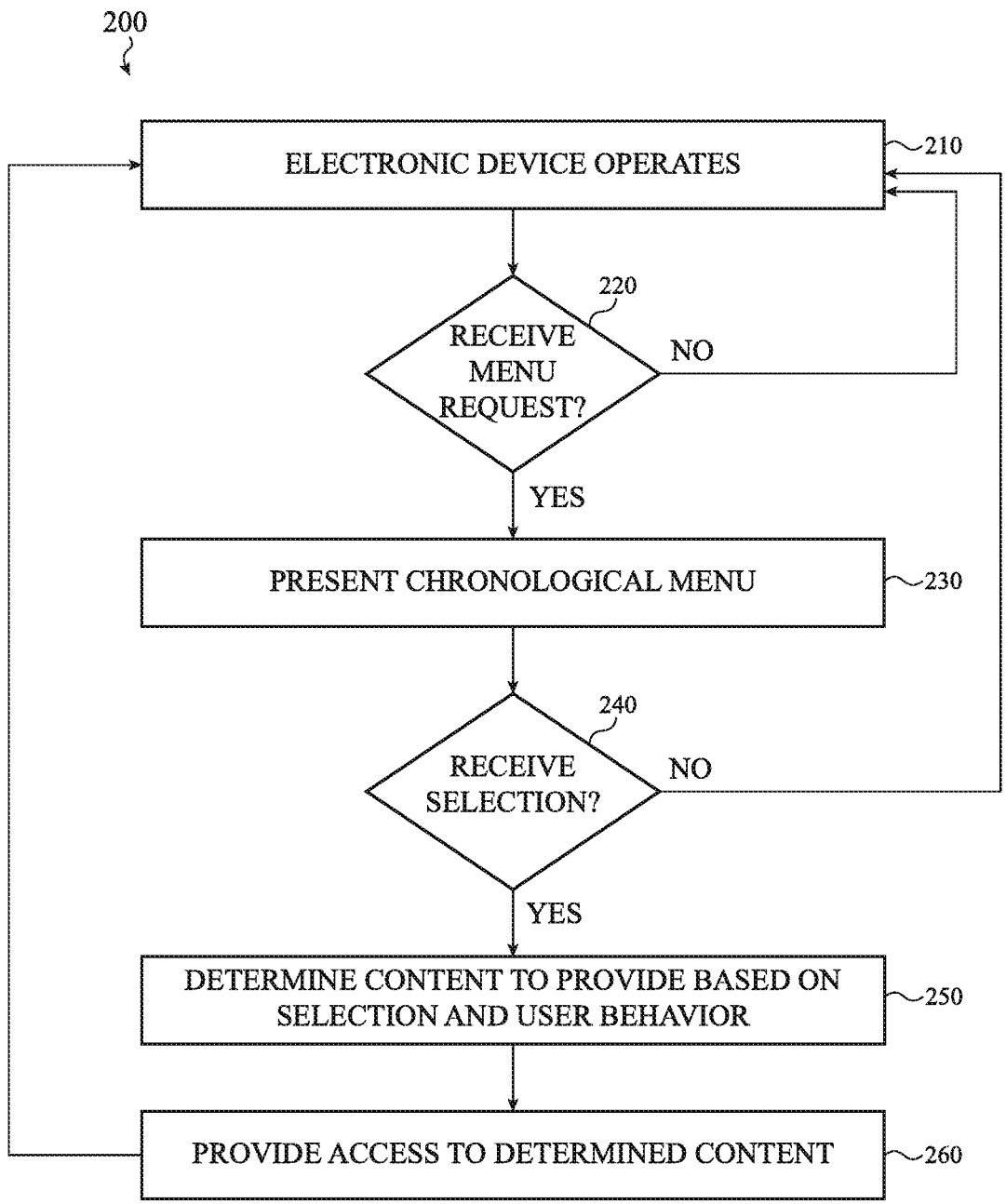
FIG. 2 depicts a flow chart illustrating a method for facilitating navigation using an electronic device. This method may be performed by the content access system of FIG. 1.

FIG. 2 depicts a flow chart illustrating a method 200 for facilitating navigation using an electronic device. This method 200 may be performed by the content access system 100 of FIG. 1.

The flow begins at 210 where an electronic device, such as a content access device, operates. The flow proceeds to 220 where the electronic device determines whether or not a menu request is received. For example, a menu request may be received from a remote control or other control unit. If so, the flow proceeds to 230. Otherwise, the flow returns to 210 where the electronic device continues to operate.

At 230, after the menu request is received, the menu is presented. The menu may include an ordered group, list, ordered sequence, or sequence of icons, menu icons, thumbnails, or other items or selectable elements. Each icon may represent a content asset (such as television assets, video on demand assets, social media assets, non-linear content assets, linear content assets, and/or any other kind of content assets) that was accessed by a user using one or more content accessing applications. The group may be ordered according to the time the content asset represented by each icon was accessed, forming a "path" of the user's interactions with content assets and/or content accessing applications. The icons may be selectable by the user. The flow may then proceed to 240.

At 240, the electronic device determines whether or not a selection of one or more of the icons is received. If so, the flow proceeds to 250. Otherwise, the flow returns to 210 where the electronic device continues to operate.

At 250, after a selection of one the icons is received, content is determined to be provided based on the selection and user behavior (e.g., previous user behavior, usage statistics, user behavior data, and so on). Any number of different characteristics may be evaluated when determining content to provide in response to selection and the user behavior. This can involve the time of the selection, a current time, a time period elapsed since the access time of the respective content asset, the time since the content asset represented by the icon was accessed (or an access time), the user's current location, the location of the electronic device, the type of content asset represented by the icon, the application used to access the content asset represented by the icon, the number of content assets subsequently accessed, the particular content assets subsequently accessed, the applications subsequently accessed, and so on. In short, any characteristic that may indicate how a user will behave with respect to content may be taken into account.

For example, an icon may represent a content search (such as a search application that allows a user to search the electronic device for movies or other television shows that may be stored, receivable, orderable on demand, and so on) that a user previously executed. 80% of the time, the user returns to follow up on the search if the user selects the icon representing the content search before accessing three subsequent content assets. Further, 75% of the time, the user executes an unrelated search if the user selects the icon representing the content search after accessing three subsequent content assets. Thus, selection of the icon may present the user's previous search if the selection is prior to three subsequent content asset accesses and a general search page if the selection is after three subsequent content accesses.

By way of another example, the content may be determined based on the electronic device. For example, a user may use both a set top box and a tablet computing device. When an icon corresponding to a television show is selected on the set top box, the user may be presented with a high resolution version of the television show. However, when the icon is selected on the tablet computing device, the user may be presented with a lower resolution version of the television show more suited to presentation on a mobile device.

In another example, the content may be determined based on the communication medium to which the electronic device is connected. For example, the electronic device may connect to both a high bandwidth fiber optic connection and a lower bandwidth cellular connection. When an icon corresponding to an on demand movie is selected and the electronic device is connected to the fiber optic connection, the user may be presented with a high resolution version of the on demand movie. However, when the icon is selected and the electronic device is connected to the cellular network, the user may be presented with a lower resolution version of the on demand movie that may not consume as much of the user's cellular data allotment.

By way of still another example, determining the content to provide access to in response to a selection may include determining the content asset was accessed using a social media application, identifying a resource available via the social media application that corresponds to a subsequently accessed content asset, and selecting the resource as the determined content. For example, the subsequently accessed content may be a television show and the resource may be a parody video related to the television show.

By way of yet another example, determining the content to provide access to in response to a selection may include determining the content asset was accessed from a source that is currently unavailable or inaccessible, locating an alternate version of the content asset from another source that is available or accessible, and selecting the alternate version as the determined content. For example, the content asset may be a live television broadcast. However, the live broadcast may have completed at the time of selection. As such, it may be determined that a version of the live television broadcast is available as on demand content. Thus, the on demand version may be presented in response to the selection. In some cases, the on demand version may be presented at the point in the content where the previous access of the live television broadcast was stopped.

In still another example, content may be determined based on events happening in the world. For example, when an event such as the Olympics is occurring, content determinations may be influenced by such events. In one example, a user may select an icon corresponding to a new channel while the Olympics is occurring. As such, a list of news items related to the Olympics may be presented. In another example, a user may select an icon corresponding to a weather web site while a severe weather event is occurring in the user's area and a portion of the weather web site including notifications related to the local severe weather event may be presented.

In yet another example, the user may have finished watching episode eight of a show seven content assets ago. The user may have just finished watching episode nine of the show. When the user selects the icon in the menu corresponding to episode eight of the show is selected, the user may instead be presented with episode ten since the user has finished both episodes eight and nine of the show.

By way of another example, the user may have been watching a show on channel 30. The menu may include icons for both the show and for channel 30. When the user selects the icon for the show, live broadcast for the show on channel 30 may have ended. As such, the user may be presented with video on demand content that is available for the show.

By way of yet another example, a user may like a cooking show on a social media application. The menu may then be populated with a corresponding icon. When the user selects the icon, the user may be presented with the cooking show.

In still another example, an icon related to a social media application may be included in menus for two different users. The first user may consistently go to a home page when using that social media application, but the second user may regularly go to a particular news feed in that social media application. As such, selection of the icon by the first user in the first user's menu may present the first user with the home page of the social media application whereas selection of the icon by the second user in the second user's menu may present the first user with the particular news feed in the social media application.

At 260, access to the determined content is provided. The flow then returns to 210 where the electronic device continues to operate.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as returning to 210 where the electronic device continues to operate if a selection of an icon is not received at 240. However, it is understood that this is an example. In some implementations, the flow may instead return to 230 where presentation of the menu is continued until a selection is received, until a request to remove the menu is received, and so on.

Figure 3:
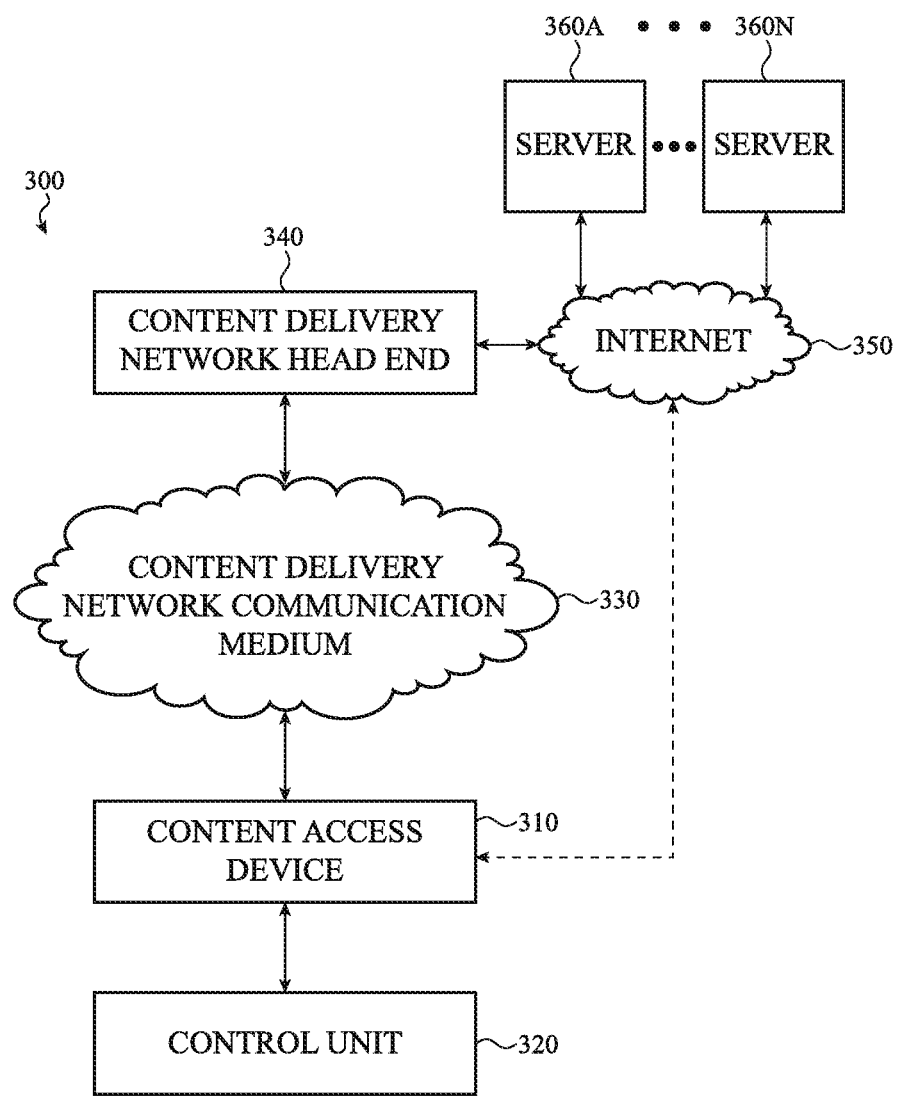
FIG. 3 depicts another example of a content access system that may perform the method of FIG. 2.

FIG. 3 depicts another example of a content access system 300 that may perform the method of FIG. 2. The content access system 300 includes a content access device 310 connected to a content delivery network head end 340 and/or one or more other content delivery network devices via one or more content delivery network communication media 330, such as one or more cable connections, satellite connections, Internet connections, fiber optic connections, cellular network connections, WiFi connections, and so on.

The content access device 310 may access, present, and/or store content received from the content delivery network head end 340 via the content delivery network communication medium 330. The content access device 310 may also access, present, and/or store content received (via the content delivery network communication medium 330) from one or more servers 360A-360N or other computing devices connected to the content delivery network head end 340 via the Internet 350 and/or other network. Further, the content access device 310 may also access, present, and/or store content received from the one or more servers 360A-360N directly via the Internet 350 and/or other network.

A control unit 320, such as a remote control, may be communicably connected to the content access device 310. The control unit 320 may be operable to transmit one or more instructions to the content access device 310.

Figure 4:
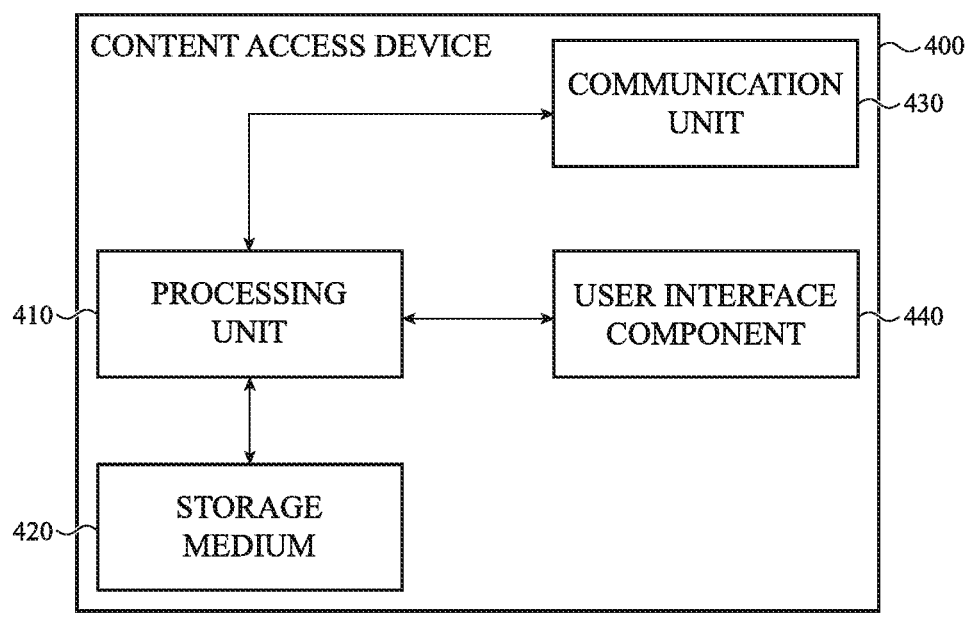
FIG. 4 depicts an example content access device that may be used in the systems of FIGS. 1 and/or 3 and/or perform the method of FIG. 2.

FIG. 4 depicts an example content access device 400 that may be used in the systems 100, 300 of FIGS. 1 and/or 3 and/or perform the method 200 of FIG. 2. The content access device 400 may be any kind of electronic device capable of displaying and/or otherwise presenting stored and/or received content. Examples of such electronic devices include, but are not limited to, set top boxes, cable boxes, digital video recorders, network digital video recorders, digital media players, desktop computing devices, laptop computing devices, digital video disc players, video cassette recorders, tablet computing devices, smart phones, mobile computing devices, cellular telephones, wearable devices, and so on.

The content access device 400 may include one or more processing units 410, one or more non-transitory storage media 420 (which may take the form of, but is not limited to, a magnetic storage medium; optical storage medium; magneto-optical storage medium; read only memory; random access memory; erasable programmable memory; flash memory; and so on), one or more communication units 430, one or more user interface components 440 (such as one or more displays, speakers, connections to output devices such as televisions or other displays, surround sound systems, and the like), and so on. The processing unit 410 may execute instructions stored in the storage medium 420 to perform various functions, such as to receive and/or store content, present and/or otherwise access content (such as using the user interface component 440), prevent one or more menus and/or other navigational tools, and so on.

The content access device 400 may receive one or more instructions from one or more remote controls and/or other control devices via the communication unit 430. Such a remote control may include one or more of the components of the content access device 400 and/or other similar components.

Although the present disclosure describes a menu including elements corresponding to content assets previously accessed by a user where selection of the menu items results in the presentation of content that may not be the previously accessed content asset, it is understood that this is an example. In various implementations, selection of such an element may instead present the user with the previously accessed content asset. Such presentation may provide access to the content asset in the precise state the content asset was previously in when last accessed. Various implementations are possible and contemplated.

As described above and illustrated in the accompanying figures, the present disclosure relates to content access menus that are tailored to users. A content access menu includes elements that correspond to content assets that a user has accessed and are arranged, organized, or sequenced in chronological order of access (e.g., chronological access or the order in which the content assets were chronologically accessed). When one of the elements is selected, content is presented determined based at least on the content asset that corresponded to the element and information about the user. Rather than presenting the original content asset that related to the element, this content access menu instead presents the user with content that is tailored for that user based on the user's behaviors such as navigation patterns. This improves operation of the content access device by reducing the time and resources used in facilitating user access to content, as well as by making it easier for users to find content they wish to access.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A content access system, comprising:
   a non-transitory storage medium storing instructions; and
   a processing unit that executes the instructions to:
   instruct presentation of a first selectable element that corresponds to a first content asset accessed by a user;
   instruct presentation of a second selectable element that corresponds to a second content asset accessed by the user; and
   in response to selection of the first selectable element, provide access to an alternative content asset the user is determined to be likely to choose instead of the first content asset wherein the alternative content asset is determined based on:

the first content asset is of a first type that the user does not typically access using the processing unit; and the alternative content asset is of a second type that the user typically accesses using the processing unit.

2. The content access system of claim 1, wherein:
the first type corresponds to a first content rating; and
the second type corresponds to a second content rating.

3. The content access system of claim 1, wherein:
the first type corresponds to a first content category; and
the second type corresponds to a second content category.

4. The content access system of claim 1, wherein:
the first type corresponds to television assets; and
the second type corresponds to video on demand assets.

5. The content access system of claim 1, wherein:
the first type corresponds to free content; and
the second type corresponds to pay content.

6. The content access system of claim 1, wherein:
the first type corresponds to a private content access mode; and
the second type corresponds to a public content access mode.

7. The content access system of claim 1, wherein the processing unit provides access to the second content asset upon selection of the second selectable element.

8. A content access system, comprising:
a non-transitory storage medium storing instructions; and
a processing unit that executes the instructions to:
instruct presentation of a first selectable element that corresponds to a first content asset accessed by a user;
instruct presentation of a second selectable element that corresponds to a second content asset accessed by the user; and
in response to selection of the first selectable element, provide access to an alternative content asset the user is determined to be likely to choose instead of the first content asset wherein the alternative content asset is determined based on:
a communication medium to which the processing unit is connected; and
the first content asset is available via a first communication medium but not a second communication medium.

9. The content access system of claim 8, wherein:
the first communication medium comprises a cable connection; and
the second communication medium comprises an internet connection.

10. The content access system of claim 8, wherein the second communication medium comprises a cellular network connection.

11. The content access system of claim 8, wherein the second communication medium comprises an internet connection.

12. The content access system of claim 8, wherein:
the first communication medium is accessible from a first location; and
the second communication medium is accessible from a second location.

13. The content access system of claim 8, wherein:
the first communication medium is accessible from one location; and
the second communication medium is accessible from multiple locations.

* * * * *